United States Patent
Tsunobuchi et al.

(10) Patent No.: US 6,474,555 B1
(45) Date of Patent: Nov. 5, 2002

(54) OPTICAL READER, OPTICAL READING METHOD AND OPTICAL READING SYSTEM

(75) Inventors: Hirokazu Tsunobuchi, Osaka (JP); Hideki Hashimoto, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 09/449,468

(22) Filed: Nov. 29, 1999

(30) Foreign Application Priority Data

Apr. 19, 1999 (JP) .......................................... 11-111453

(51) Int. Cl.[7] .......................... G06K 7/10; G02B 26/00
(52) U.S. Cl. .......................... 235/462.01; 235/462.25; 235/462.38
(58) Field of Search ................ 235/462.25, 462.26, 235/462.27, 462.28, 462.29, 462.38, 462.07, 462.1, 462.11, 462.01

(56) References Cited

U.S. PATENT DOCUMENTS

| | | | |
|---|---|---|---|
| 5,278,397 A | | 1/1994 | Barkan et al. |
| 5,627,358 A | * | 5/1997 | Roustaei ................. 235/462.11 |
| 5,959,282 A | * | 9/1999 | Tabuchi ...................... 235/454 |
| 6,142,377 A | * | 11/2000 | Itoh et al. .............. 235/462.12 |

FOREIGN PATENT DOCUMENTS

| | | | | |
|---|---|---|---|---|
| JP | 04268985 A | * | 9/1992 | ............ 235/462.27 |
| JP | 5197830 | | 8/1993 | |

* cited by examiner

Primary Examiner—Karl D. Frech
Assistant Examiner—April Nowlin
(74) Attorney, Agent, or Firm—Sughrue Mion, PLLC (57) ABSTRACT

An optical reader for optically reading recorded code data and determining whether the reading is successful or not. In the optical reader, a frequency of coincidence of read data from start of reading is compared with a predetermined reference frequency when it is determined that the reading is successful after the reading of the code data is repeatedly tried to determine a stability of reading, so that a signal showing a result of the determination is output.

18 Claims, 9 Drawing Sheets

○ READING SUCCEEDED (CORRECT VALUE)
△ READING SUCCEEDED (ERROR)
✕ READING FAILED

OPTICAL READER, OPTICAL READING METHOD AND OPTICAL READING SYSTEM

BACKGROUND OF THE INVENTION

1. Field of the Invention

The present invention relates to an optical reader for reading recorded code data, an optical reading method and an optical reading system, and particularly relates to a technique for determining the stability of reading activity and predicting a change of reading performance.

2. Description of the Related Art

Heretofore, an optical reader for reading a label on which code data is recorded one-dimensionally such as a bar code reader is normally provided with a laser beam emitting circuit for emitting a laser beam, scanning means for attaching a polygon mirror to a rotating shaft and rotating the polygon mirror by a motor or the like and a light receiving element for generating an electric signal by receiving a laser beam reflected from a bar code to be read, and the code data of the bar code is detected by scanning a laser beam output from the laser beam emitting circuit on the bar code by the scanning means and decoding a signal output from the light receiving element.

Recently, a two-dimensional code in which the recordable quantity of information can be greatly increased and code data is two-dimensionally recorded has been developed in place of the above bar code. To read the code data of the two dimensional code, an optical reader using an image sensing device for example is used.

In the above optical reader, a reading error may occur and a reading speed may be deteriorated due to the contamination of a recorded code, the change of density and a failure of formation when a code is printed or marked, the existence of disturbed light, the contamination of a polygon mirror and a light emitting section of the optical reader or the like. Therefore, it is known that fixed reading stability cannot be acquired for a long term.

The stability of reading is the most important factor for such an optical reader and a device for supplementarily outputting an index to evaluate the stability of reading has been made heretofore.

For the index of the stability of reading, the frequency of reading trials (scanned frequency), the frequency of successful reading, the combination of these indexes or the like can be given. Then, a technique for providing reading stability verification means for outputting these indexes as supplementary information and judging a state in which a code is recorded is known.

However, the verification of the above conventional type stability of reading is the evaluation determined based upon only a threshold of whether reading is successful or not and when it is determined that reading is successful, it is not evaluated how the stability of reading is when the reading is successful. Therefore, if reading is continued as it is, it is difficult to grasp whether the result of reading is normal or not.

For example, if the recording density of a bar code label or the like becomes faint as time goes or if dust and contamination are gradually deposited on a light emitting section and the like of the optical reader, reading is normally performed in the initial operation of the optical reader, stability is gradually deteriorated and finally, reading may be disabled. In such a case, a situation that an error suddenly occurs without previous notice during reading in the conventional optical reader occurs.

When such a situation occurs, the whole system is required to be once stopped and to be maintained in a system to which the optical reader is connected and if the optical reader is used for a manufacturing line, great deal of loss time occurs and the manufacturing cost is increased.

SUMMARY OF THE INVENTION

The present invention is provided to solve such problems and an object t thereof is to provide an optical reader, an optical reading method and an optical reading system which can respectively cope before a state that reading is disabled occurs by always determining how the stability of reading is even if reading of code data is enabled and outputting a signal.

To achieve the above object, according to a first aspect of the present invention, there is provided an optical reader for optically reading recorded code data and determining whether the reading is successful or not, comprising: a light emitting means for emitting light to an object having code data; a light receiving means for receiving the light reflected on the code data of the object; and a stability determination means for comparing a frequency of coincidence of read code data from start of reading with a predetermined reference frequency when it is determined that the reading is successful after the reading of the code data is repeatedly tried, determining a stability of reading and outputting a signal showing a result of the determination.

According to a second aspect of the present invention, there is provided an optical reader for optically reading recorded code data and determining whether the reading is successful or not, comprising: a light emitting means for emitting light to an object having code data; a light receiving means for receiving the light reflected on the code data of the object; and a stability determination means for comparing time which elapses from start of reading until read data is coincided by a predetermined frequency with predetermined reference time when it is determined that the reading is successful after the reading of the code data is repeatedly tried, determining a stability of reading and outputting a signal showing a result of the determination.

According to a third aspect of the present invention, there is provided an optical reading system for optically reading recorded code data and determining whether the reading is successful or not, comprising: an optical reading means comprising a light emitting means for emitting light to an object having code data, and a light receiving means for receiving the light reflected on the code data of the object; a stability determination means for comparing a frequency of coincidence of read code data from start of reading with a predetermined reference frequency when it is determined that the reading is successful after the reading of the code data is repeatedly tried, determining a stability of reading and outputting a signal showing a result of the determination; and a control means for inputting the output signal of the stability determination means.

According to a fourth aspect of the present invention, there is provided an optical reading method comprising the steps of: optically reading recorded code data of an object; determining whether the reading is successful or not, wherein when the reading of the code data is carried out, the reading activity is done repeatedly; comparing a frequency of coincidence of read data from start of reading with a predetermined reference frequency; determining a result of stability of reading based on the comparison when the reading is successful; and outputting an output signal indicating the result of the determination.

According to a fifth aspect of the present invention, there is provided an optical reading method comprising the steps of: optically reading recorded code data of an object by a plurality of optical reading devices; determining whether the reading is successful or not, wherein when the reading of the code data is carried out, the reading activity is done repeatedly; comparing a frequency of coincidence of read data from start of reading with a predetermined reference frequency; determining a result of stability of reading based on the comparison when the reading is successful, wherein when the result of determination that stability is low is output from a plurality of optical reading devices in reading the same data, it is determined that a specified code data is erroneous; and outputting an output signal indicating the result of the determination and the specified code data.

According to a sixth aspect of the present invention, there is provided an optical reading method comprising the steps of: optically reading recorded code data of an object by a plurality of optical reading devices; determining whether the reading is successful or not, wherein when the reading of the code data is carried out, the reading activity is done repeatedly; comparing a frequency of coincidence of read data from start of reading with a predetermined reference frequency; determining a result of stability of reading based on the comparison when the reading is successful, wherein when the result of determination that stability is low is output from the same optical reading device irrespective of code data, it is determined that the same optical reading device fails; and outputting an output signal indicating the result of the determination and the same optical reading device.

DETAILED DESCRIPTION OF THE PREFERRED EMBODIMENTS

Referring to the drawings, preferred embodiments of the optical reader according to the present invention will be described in detail below.

Figure 1:
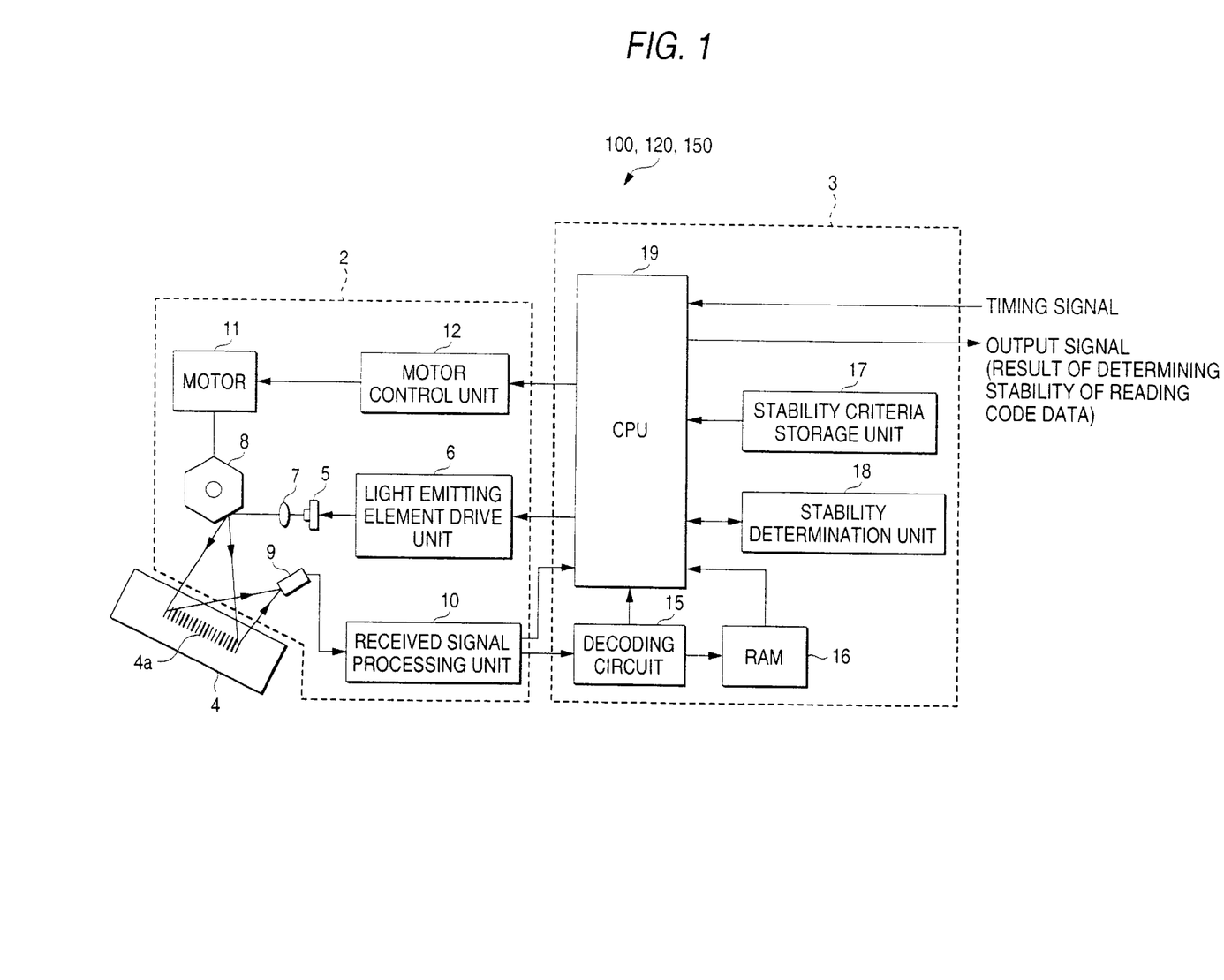
FIG. 1 is a block diagram showing the configuration of first, third and sixth embodiments of the optical reader according to the present invention.

FIG. 1 is a block diagram showing the configuration of a first embodiment of the optical reader according to the present invention.

An optical reader 100 of this embodiment has an optical reading section 2 for reading code data and a control section 3 for controlling the optical reading section 2, and reads code data by scanning a laser beam on a bar code label 4 where the code data to be read is recorded, detecting its reflected light and decoding it.

The optical reading section 2 is composed of a light emitting element 5 such as a semiconductor laser diode for emitting a laser beam, a light emitting element drive unit 6 for driving the light emitting element 5, a lens 7 for imaging the laser beam output from the light emitting element 5 on the bar code label 4, a polygon mirror 8 for scanning the laser beam passing through the lens 7 on a bar code 4a of the bar code label 4, a light receiving element 9 such as a photodiode for receiving the laser beam reflected on the bar code label 4 and;generating an electric signal, a received signal processing unit 10 for amplifying and quantizing the signal output from the light receiving element 9, a motor 11 for turning the polygon mirror 8 and a motor control unit 12 for controlling the driving of the motor 11.

The control section 3 is composed of a decoding circuit 15 for decoding code data based upon an output signal from the received signal processing unit 10 of the optical reading section 2, an RAM 16 for storing the code data decoded by the decoding circuit 15, a stability criteria storage unit 17 the details of which are described later, a stability determination unit 18 and a CPU 19 for controlling each unit included in the control section 3. The stability criteria storage unit 17 and the stability determination unit 18 are equivalent to stability determination means.

To detect bar code data, the CPU 19 instructs the light emitting element drive unit 6 of the optical reading section 2 to drive the light emitting element 5 and instructs the light emitting element to irradiate a laser beam on the bar code label 4 via the polygon mirror 8 to scan the laser beam on the bar code label when a timing signal is supplied to the CPU from an external device. Code data detected and decoded by each scan is stored in the RAM 16. The CPU 19 detects bar code data until preset criteria of whether reading is successful or not are met.

If reading is successful, the CPU 19 determines the stability of the reading based upon various criteria previously stored in the stability criteria storage unit 17 and read information from the optical reading section 2 input via the CPU 19. The result of the determination of the stability is output to an external device such as a host control unit.

The stability determination unit 18 receives the frequency of all scans and the frequency in which bar code data was precisely read (that is, the frequency of success or the frequency of the coincidence of data) from the CPU 19, calculates a value (ratio N/m) acquired by dividing the frequency N of all scans by the frequency m of success and compares the ratio N/m with a criterion value. If the ratio is equal to or more than the criterion value, the result of the determination of stability that the stability of reading is low is output to the CPU 19 and if the ratio is smaller than the criterion value, the result of the determination of stability that the stability of reading is high is output. The CPU 19 receives the above result of the determination, generates data by integrating the result of the determination, read code data and ID of the optical reader itself and outputs the data to a host control unit 30.

The above case that the ratio is equal to or more than the criterion value is caused in a case that the surface of the polygon mirror 8 is contaminated, in a case that the intensity of emission by the light emitting element 5 is deteriorated, in a case that the lens 7 is contaminated, in a case that the sensitivity of the light receiving element 9 is deteriorated, in a case that the bar code label 4 is contaminated or is printed at faint density and in other cases.

Figure 2:
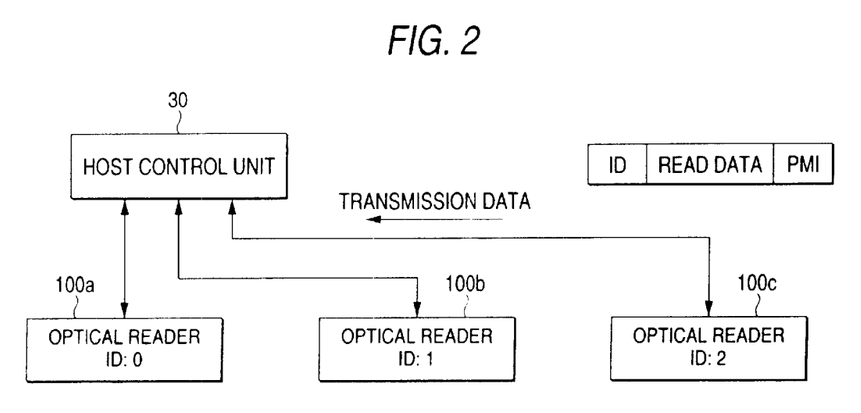
FIG. 2 is a block diagram showing the configuration of an optical reading system using the optical reader shown in FIG. 1.

FIG. 2 shows an example of an optical reading system composed of three optical readers 100a, 100b and 100c. These plural optical readers are connected to the host control unit for controlling each optical reader via communication means such as a network.

ID for identifying each optical reader out of other optical readers is allocated to each optical reader and transmission data is composed of ID, read data and preventive maintenance information (PMI) (for example, "1" denotes that reading is unstable and "0" denotes that reading is stable) which is the result of determining the stability of reading. The host control unit 30 recognizes which optical reader outputs a signal based upon ID in the transmission data when it receives an output signal from each optical reader and recognizes the result of determining the stability of reading based upon the value of PMI.

Plural criteria values to be stored in the stability criteria storage unit 17 are prepared so that an optimum value can be set in accordance with the specifications of the system and the host control unit 30 can suitably select them. A switch or the like may be provided outside the body of the optical reader 100 so that a user can arbitrarily select them.

Next, the operation of the optical reader 100 and the host control unit 30 will be described.

Figure 3:
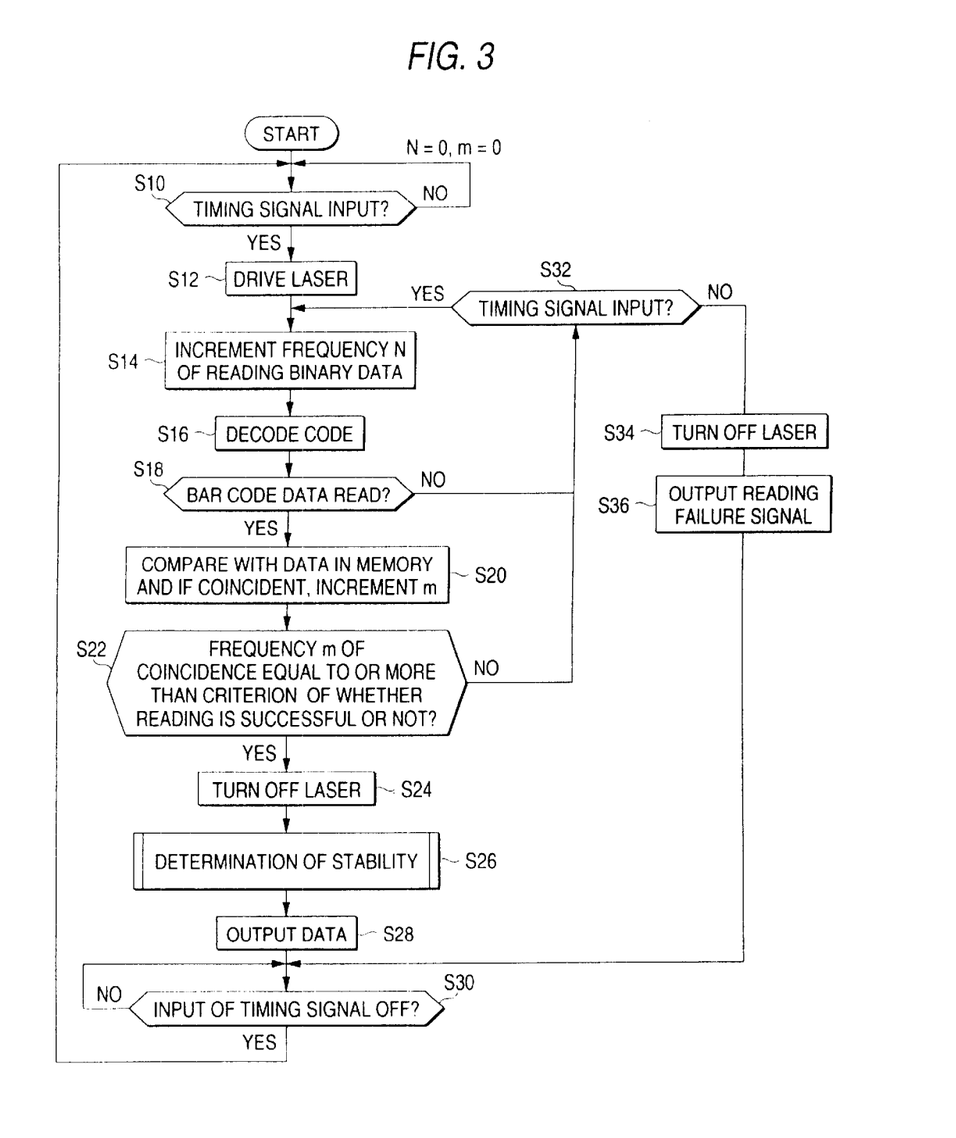
FIG. 3 is a flowchart showing the reading operation of the optical reader according to the present invention.

FIG. 3 shows a flowchart for explaining the operation of the CPU 19 in the optical reader 100. Referring to the flowchart, the operation will be sequentially described.

First, the frequency N of reading scans is set to 0, the frequency m of the coincidence of read data is set to 0 and it is determined whether a timing signal is input from an external device or not (step 10, hereinafter referred to as S10). When a timing signal is input, a laser is driven (S12), the intensity of reflection from the bar code 4a is binarized and the binary data to read code data is read (S14). At this time, the frequency N of scans by a laser beam is incremented by one. The reading of bar code data is carried out when a timing signal is turned off or in a range in which the capacity of the RAM 16 is not exceeded.

Code data is decoded based upon the read bar code 4a (S16) and it is determined based upon the result of the above decode whether bar code data has been read or not (S18). When it is judged that the bar code data has been read, data (data read last time, indeterminate in initial reading) stored in the RAM 16 and data read this time are compared and if both data are coincident, the frequency m of coincidence is incremented by one (S20).

Next, it is determined whether or not the frequency m of coincidence is equal to or more than a preset criterion of whether reading is successful or not (S22) and if the frequency of coincidence is equal to or more than the criterion, the laser is turned off (S24) and the stability of reading described in detail later is determined (S26).

In the meantime, if it is determined in S18 that bar code data has not been read or if it is determined in S22 that the frequency of coincidence is smaller than the criterion value, it is determined whether a timing signal is input or not (S32) and if the timing signal is input, processing is returned to the reading of binary data (S14). If no timing signal is input, the laser is turned off (S34) and a reading failure signal is output (S36).

Figure 4:
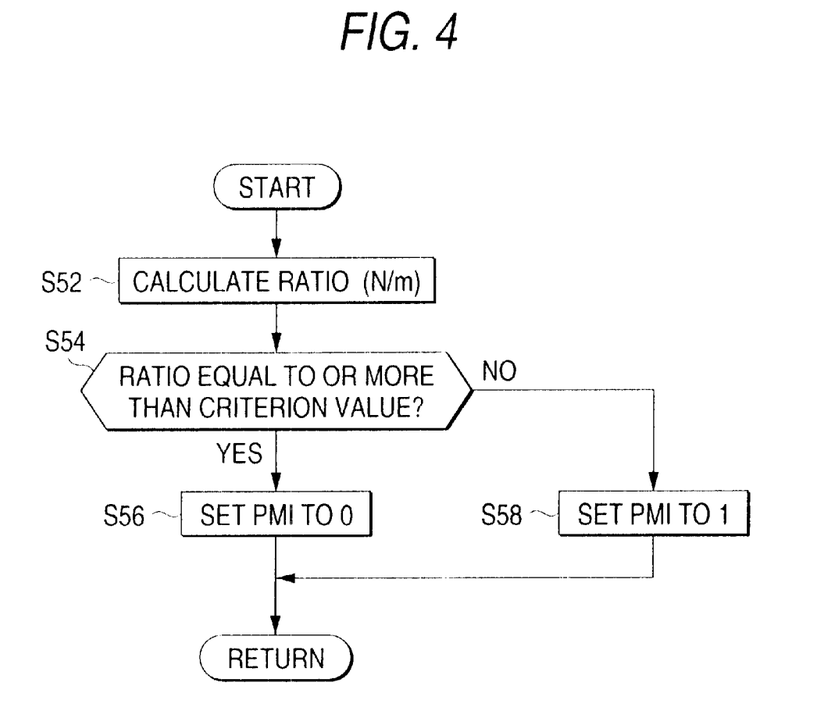
FIG. 4 is a flowchart showing a method of determining the stability of reading in the first embodiment.

Next, referring to a flowchart shown in FIG. 4, processing for determining stability will be described. FIG. 4 is a flowchart for explaining the operation of the stability determination unit 18 in the optical reader 100.

First, ratio N/m is calculated by dividing the frequency N of all scans by the frequency m of coincidence using the frequency N of all scans acquired in S14 to S22 shown in FIG. 3, the result of the decode of a code or the frequency m in which read data is coincident (S52) and it is judged whether acquired ratio is equal to or more than a predetermined criterion value or not (S54).

If the ratio is equal to or more than the criterion value, it is judged that the stability of reading is low and the value of PMI is set to 1 (S56). If the ratio is smaller than the criterion value, it is judged that the stability of reading is high and the value of PMI is set to 0 (S58).

After stability is determined as described above, code data which is the result of reading and the value of PMI which is the result of the determination of stability are output together with the ID number of the optical reader in S28 shown in FIG. 3. It is determined whether the input of a timing signal has been off or not (S30), if it is judged that the input of a timing signal has not been not off, the processing of determination is repeated and if it is judged that the input has been off, processing is returned to S10.

After a reading failure signal is output in S36, it is also determined whether the input of a timing signal has been off or not (S30) and processing as described above is performed.

As described above, a bar code is read and code data is decoded. When reading succeeds, the stability of reading is determined by comparison with a criterion value supplied from the stability criteria storage unit 17 in the stability determination unit 19, and if the stability is high, the value of PMI is set to 0, and if the stability is low, the value of PMI is set to 1 and either value is output together with the read data of the bar code. When reading fails, a reading failure signal is output. Therefore, as not only the read data of a bar code is output but the result of determining the stability of reading is output, information can be simply transmitted at high speed without complicating the transmitting/receiving of data to/from an equipment connected to the optical reader.

Next, the operation of the host control unit will be described.

The host control unit 30 checks ID and PMI when it receives a signal output from the optical reader 100 and if the value of PMI is 1, the host control unit 30 instructs a monitor (not shown) to display a message that reading is unstable corresponding to its ID. At this step, the host control unit 30 and the monitor have function as a notification unit of the result of the determination based on the aforementioned stability determination means to an operator for operating and monitoring the device. For example, a message "READING IS UNSTABLE ID:0" is displayed. According to this display, the operator can realize that the read code data having "0" as the corresponding ID is unstable condition. In the meantime, if the value of PMI is 0, no message is displayed or a message "READING IS STABLE ID: 0" for example is displayed. According to the display, the operator can realize that the reading activity has a stable condition at that time.

When an output signal showing that the value of PMI is 1 is sent from each optical reader 100 if same bar code label 4 is read by plural optical readers, 100, the host control unit 30 determines that the bar code label 4 causes unstable reading and instructs the monitor to display "LABEL CAUSES UNSTABLE READING". According to this type of display, the operator can realize the specified label installed on the object has problem to cause the unstable condition.

If ten optical readers 100 are connected and an output signal showing that the value of PMI is 1 is sent from at least a few (for example, three) of the ten optical readers 100 even if transmission data that the value of PMI is 1 is not output from all of plural optical readers 100, it may be also determined that the bar code label 4 causes unstable reading.

As described above, in this embodiment, the ratio of the frequency in which bar code data has been precisely read (the frequency of successful reading or the frequency of the coincidence of data) to the frequency of all scans of the bar code label 4 is acquired, and if the ratio is equal to or more than a predetermined criterion value, it is judged that reading is unstable because the ratio of the reading of the bar code 4a is deteriorated because of the contamination of the surface of the polygon mirror 8 in the optical reader 100, the deterioration of the intensity of emission by the light emitting element 5, the contamination of the lens 7, the deterioration of the sensitivity of the light receiving element 9, the contamination, the faint printing and an incomplete mark of the bar code label 4 or the like. In this case, information that the value of PMI is 1 is output to the host control unit 30 together with read data. The host control unit 30 instructs the monitor to display a message that reading is unstable corresponding to ID when the host control unit 30 detects that the value of PMI is 1 based upon received transmission data.

If an output signal showing that the value of PMI is 1 is output from all or a predetermined number of plural optical readers 100 to the host control unit 30, the host control unit 30 judges that the bar code label 4 causes unstable reading and instructs the monitor to display information notifying of it.

Therefore, as the optical reader 100 determines the stability of reading bar code data, the host control unit 30 is not required to execute processing for the determination, has only to inform a display or the like based upon the result of determination by the optical reader 100 and the load of the host control unit 30 can be greatly reduced.

As the optical reader 100 outputs the result of the determination of stability together with the read data of the bar code label 4, real time processing by the host control unit 30 is enabled even during the operation of the system.

Also, as the optical reader 100 determines the stability of reading bar code data and output s the result to the host control unit 30, the host control unit 30 can determine whether the optical reader 100 or the bar code label 4 causes unstable reading and can output either of an optical reader failure signal or a code error signal. That is, if the stability of reading the bar code 4a of one optical reader is low and the stability of reading of the residual all optical readers is high in case the same bar code label 4 is read by plural optical readers, it can be judged that the one optical reader causes unstable reading. If the stability of reading the bar code 4a of all plural optical readers is low, it can be judged that the bar code label 4 causes unstable reading.

Further, if only the stability of reading a specific bar code label 4 is low and the stability of reading the other bar code labels 4 is high in case the bar code labels are read by one optical reader, the bar code 4a the stability of reading of which is low causes unstable reading and if the stability of reading any bar code label 4 is low, it can be judged that the optical reader causes unstable reading.

As described above, as a user can immediately judge the cause of unstable reading, he/she can improve unstable reading in a short time and the cost such as personnel expenses can be reduced.

If the surface of the polygon mirror 8 the frequency of success in reading of which is small or the ratio of reading of which is low is found by counting the frequency of success in reading every surface of the polygon mirror 8 or by calculating the ratio of reading of which, a reading unstable signal may be output.

A pattern of a bar code is printed on the bar code label 4 in this embodiment, however, a label or an object may be directly marked. For this type, the failure of a mark is detected based upon the stability of reading and a request for the maintenance of a marking process may be output.

For the similar criterion to the frequency of reading trials and the frequency of success in reading, the frequency of decoding trials, the frequency of success in decoding and the frequency of the finding of a bar code candidate can be given. As no read data is acquired even if blank paper is scanned, a frequency when data is actually read is used to avoid an unnecessary frequency of reading. Time in which a timing signal required for starting reading is on or time in which the light emitting element 5 is on can be also given. Another embodiment using a criterion other than the above will be described below.

Next, a second embodiment of the optical reader according to the present invention will be described.

Figure 5:
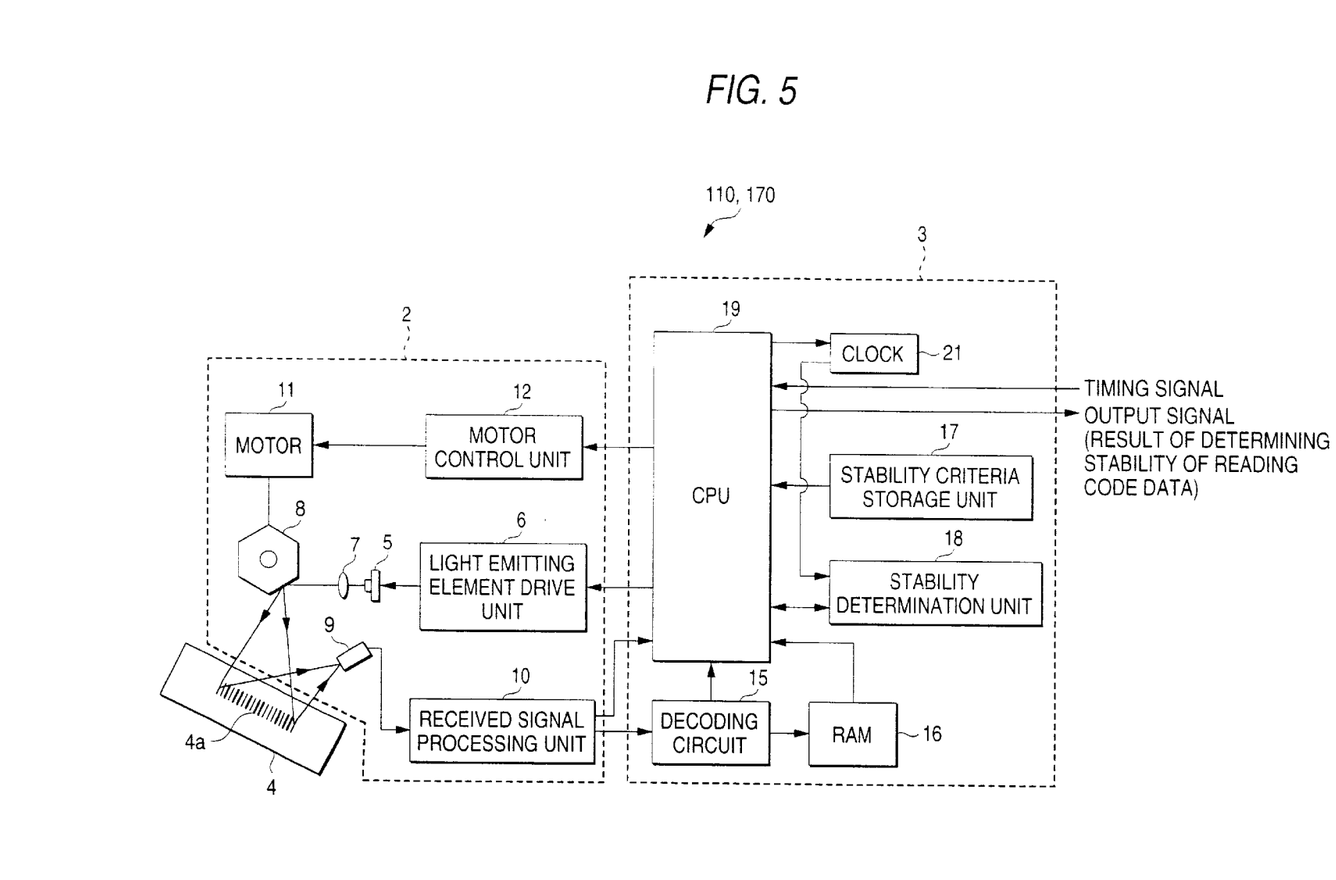
FIG. 5 is a block diagram showing the configuration of second and eighth embodiments of the optical reader according to the present invention.

FIG. 5 is a block diagram showing the configuration of an optical reader 110 of this embodiment. In this embodiment, a clock 21 for timing is provided in a control section 3 in addition to the configuration of the optical reader 100 of the first embodiment and its output is input to a stability determination unit 18. In this configuration, for a criterion for the stability of reading, time required for reading which is timed by the clock 21 is used. That is, time until a bar code 4a on one bar code label 4 is correctly read twice for example continuously since reading is started (time until read data is coincident) is timed by the clock 21 and if the time exceeds a preset criterion value, it is determined that reading is unstable.

Figure 6A:
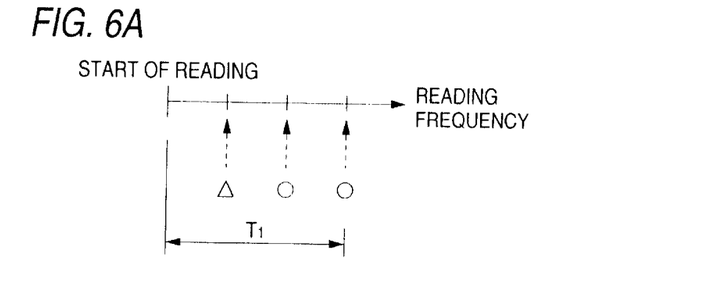
FIGS. 6A and 6B are explanatory diagrams for explaining the reading function in the second embodiment of the optical reader according to the present invention.
Figure 6B:
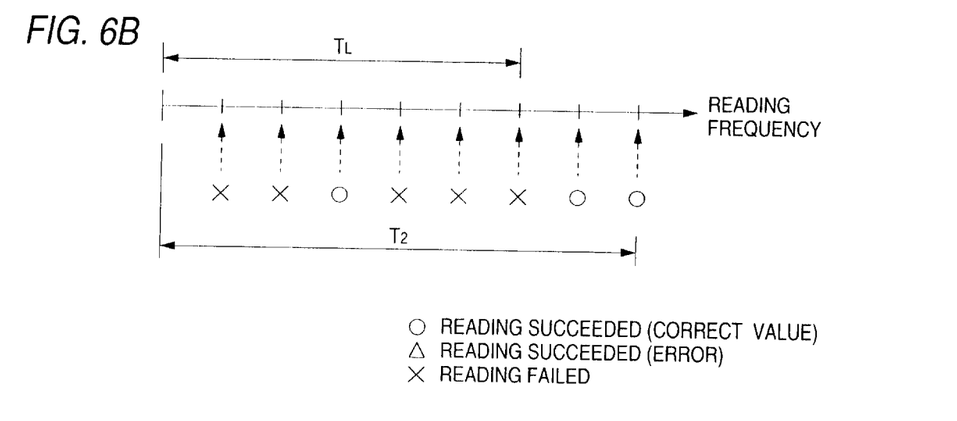

FIG. 6A shows an example that the bar code 4a can be correctly read continuously twice at a third reading scan since a reading scan is started and time T1 is required from start of reading to completion of reading. FIG. 6B shows an example that the bar code 4a can be read continuously twice for time T2 (>T1) from start of reading scan to an eighth reading scan. If it is assumed that time TL from start of reading to a sixth reading scan is a criterion for stability, it is determined in the case shown in FIG. 6A that the stability of reading is high and it is determined in the case shown in FIG. 6B that as time T2 exceeds the criterion time TL, the stability of reading is low.

According to this method, as the stability of reading is simply determined based upon time, processing for determining the stability of reading is reduced and the control section 3 can have simpler structure. For a clock, a clock for the operation of the CPU 19 can be also used and in this case, the structure can be simplified more.

Next, a third embodiment of the optical reader according to the present invention will be described.

Figure 7:
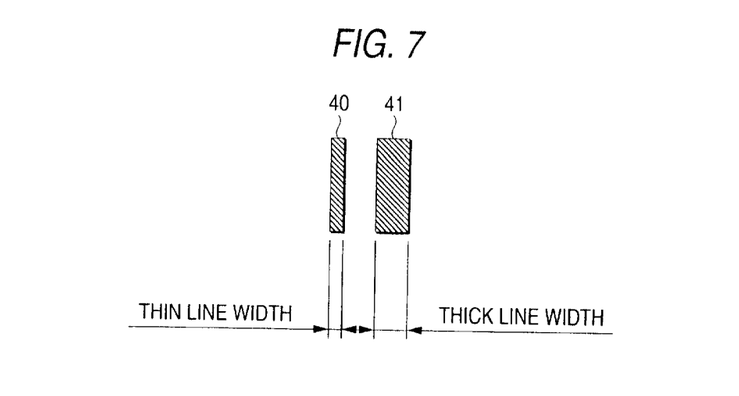
FIG. 7 is an explanatory diagram showing the line width of a bar code.

As the structure of an optical reader 120 of this embodiment is similar to the structure in the first embodiment, the description thereof is omitted. In this embodiment, a detection signal from a light receiving element 9 acquired by a reading scan is binarized, data acquired by binarization is compared with a bar code standard and the result is used for a criterion for the stability of reading. That is, as shown in FIG. 7, generally, the ratio in line width of a thinner line 40 of a bar code to a thicker line 41 is defined as 1:2 to 1:3, however, the above ratio varies depending upon printing density of a printer or the like and in the case of 1:10, an error occurs. That is, reading is disabled. In this embodiment, as code data can be normally read up to the ratio of approximately 1:4, the ratio of 1:4 is used for a criterion and if ratio exceeds this criterion, it is determined that the stability of reading is low.

As for a two dimensional code, the dimension of a cell or the like composing the code may be similarly detected and compared with a two dimensional code standard, and stability may be determined.

Hereby, in the case of a bar code (a two dimensional code) accidentally read and having code data off the standard, it can be determined that stability is low.

Next, a fourth embodiment of the optical reader according to the present invention will be described.

Figure 8:
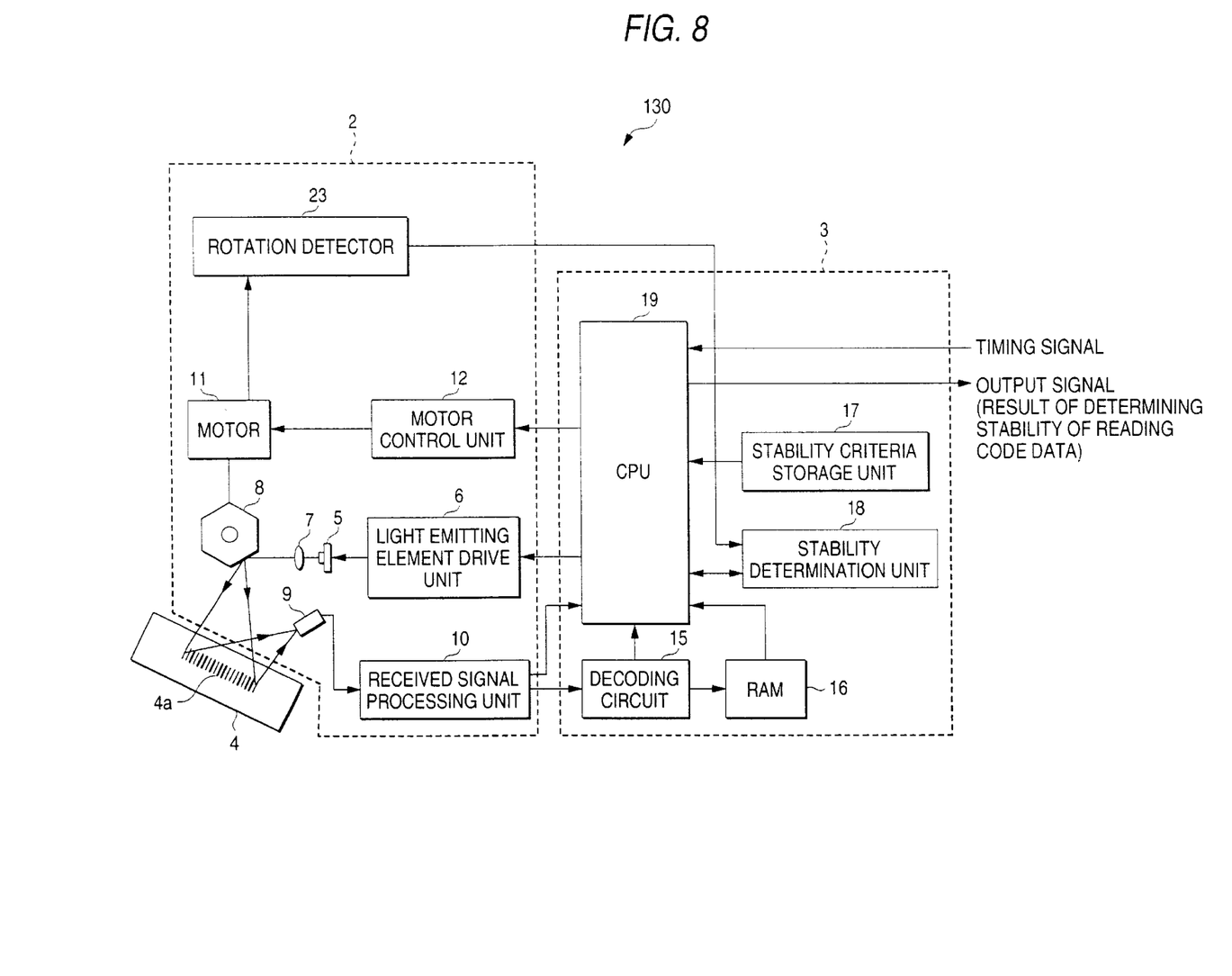
FIG. 8 is a block diagram showing the configuration of a fourth embodiment of the optical reader according to the present invention.

FIG. 8 is a block diagram showing the structure of an optical reader 130 of this embodiment. In this embodiment, a rotation detector 23 for detecting the rotation of a motor is provided in an optical reading section 2 in addition to the structure of the optical reader 100 of the first embodiment and its output is input to a stability determination unit 18. In this structure, the stability of reading is determined based upon the whole operation time detected by the rotation detector 23 of a motor 11 from start of reading to completion of reading. That is, operation time which functions as a criterion for the stability of reading is stored in a stability criteria storage unit 17 and when a CPU 19 reads bar code data for the preset frequency of trials, it reads a reference operation time from the stability criteria storage unit 17 and outputs it to the stability determination unit 18. The stability determination unit 18 inquires the whole operation time of the motor 11 of the rotation detector 23, compares the whole operation time of the motor 11 with the reference operation time and determines stability. If the whole operation time exceeds the reference operation time, the stability determination unit determines that the stability of reading is low and if the whole operation time does not exceed the reference operation time, the stability determination unit determines that the stability is high.

According to this method, as it can be directly checked whether the characteristics of the motor for driving scanning are deteriorated due to aging or not, stability can be more securely determined and the reliability of stability can be enhanced.

Other than using the whole operation time of the motor 11 for a criterion for the stability of reading, the stability of the rotation of the motor 11 may be used for a criterion. In this case, the unevenness of rotation due to the deterioration of a bearing and others is checked by detecting the rotational speed of the motor 11 and if the unevenness of rotation exceeds a criterion value, it is determined that the stability of reading is low.

Next, a fifth embodiment of the optical reader according to the present invention will be described.

Figure 9:
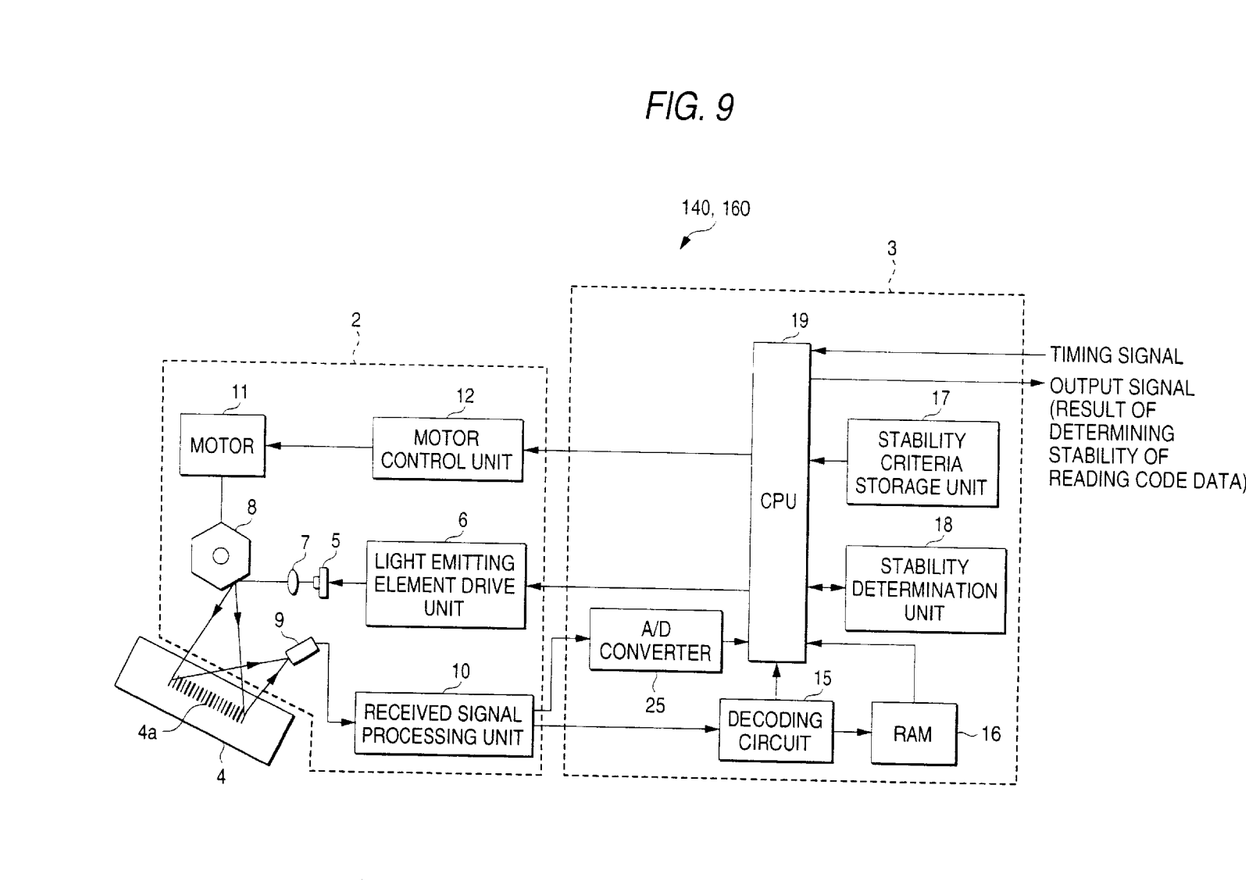
FIG. 9 is a block diagram showing the configuration of fifth and seventh embodiments of the optical reader according to the present invention.

FIG. 9 is a block diagram showing the configuration of an optical reader 140 of this embodiment. In this embodiment, an A/D converter 25 for converting output from a received signal processing unit 10 from analog to digital is provided in a control section 3 in addition to the structure of the optical reader 100 of the first embodiment and the output is input to the CPU 19.

In this embodiment, an analog signal from the received signal processing unit 10 is read, the analog signal is converted to digital data by the A/D converter 25, the measurement of the amplitude or the like of output voltage is instructed by the CPU 19, the analysis of a signal such as a frequency component is acquired based upon Fourier transform is performed and the stability of reading is determined by comparing the result with the analysis of a normal output signal.

According to this method, even the minute variation of a state can be securely grasped by the analysis of a signal and hereby, stability can be more precisely determined.

Next, a sixth embodiment of the optical reader according to the present invention will be described.

As the structure of an optical reader 150 of this embodiment is similar to the structure in the first embodiment, the description thereof is omitted. In this embodiment, the stability of reading is determined using statistical information based upon the binary data of bar code data and the other statistical information and if data off a specific tendency when normal is acquired using various statistical analyses such as clustering processing and regression analysis, it is determined that the stability of reading is low.

According to this method, the variation in aging of a read state and the direction of the variation can be definitely grasped by statistical analysis and stability can be more securely determined.

Next, a seventh embodiment of the optical reader according to the present invention will be described.

As the configuration of an optical reader 160 of this embodiment is similar to the structure in the fifth embodiment, the description thereof is omitted. In this embodiment, the ratio in reflectance of a white part to a black part in a bar code (PCS) is read and is used for a criterion for stability. That is, PCS to function as a criterion is determined beforehand and if a signal from a light receiving element 9 input from an A/D converter 25 exceeds the criterion value, it is determined that the stability of reading is low.

According to this method, the stability of reading can be more securely determined by using PCS which directly has a great effect upon the reading of code data for a criterion.

Next, an eighth embodiment of the optical reader according to the present invention will be described.

As the configuration of an optical reader 170 of this embodiment is similar to the structure in the second embodiment, the description thereof is omitted. This embodiment relates to an optical reading system in which the optical reader is connected to a host control unit and the stability of reading is determined based upon the whole operation time of the optical reading system from start of operation. That is, time from start of the operation of the system is counted by a clock provided to a control section 3, it is determined by a stability determination unit 18 whether the current total time exceeds a predetermined reference operation time or not and if the current total time exceeds the reference operation time, it is determined that the stability of reading is low.

According to this method, as the stability of reading is simply determined based upon time, processing for determining the stability of reading is reduced and the control section 3 can be more simply composed. For a clock, a clock for the operation of the CPU 19 can be also used and in this case, the structure can be more simplified.

Next, a ninth embodiment of the optical reader according to the present invention will be described.

Figure 10:
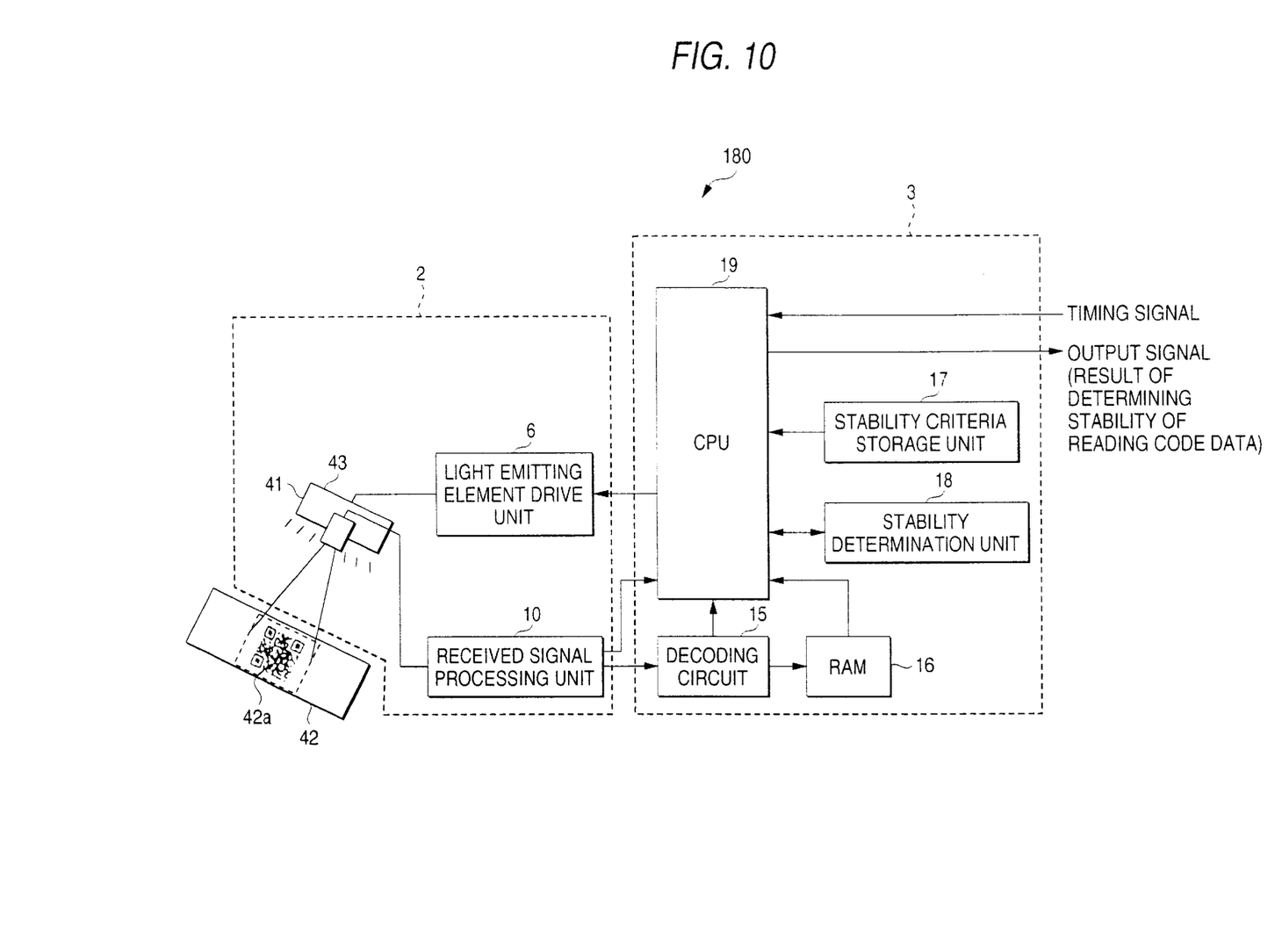
FIG. 10 is a block diagram showing the configuration of a ninth embodiment of the optical reader according to the present invention.

FIG. 10 is a block diagram showing the configuration of an optical reader 180 of this embodiment. In this embodiment, an optical reading section 40 is composed for reading a two dimensional code and the error correction rate of a read two dimensional code is used to be a criterion for the output of an instability signal.

The optical reading section 40 is composed of a ringed light source 41 consisting of a red light emitting diode (LED) for example, an image sensing device 43 consisting of a CCD camera for example for irradiating light output from the ringed light source 41 on a two dimensional code 42a on a code label 42 and sensing the two dimensional code 42a, a light emitting element drive unit 6 and a received signal processing unit 10.

For a two dimensional code, correction means such as Read-Solomon code is used when the code is patterned so that the code can be read even if a cell pattern of a part of the code is lost. Hereby, even if a part of a two dimensional code is lost, the optical reader 180 can read all bar code data. At this time, as the optical reader 180 itself executes error correction, it understands how an error is corrected. The stability of reading is determined using the level of correction as a criterion.

According to this method, as the stability of reading is determined based upon the level of correction of a two dimensional code, the stability of reading the two dimensional code can be determined by evaluating the whole pattern and stability can be more precisely determined.

A criterion for the stability of reading in the above embodiments is respectively independent, however, plural criteria in the above embodiments maybe combined. In this case, the reliability of stability can be more enhanced.

In the above first to eighth embodiments, the reading of a one-dimensional bar code is described, however, the present invention is not limited to this and can also similarly be applied to two-dimensional code data of a stack type or a matrix type.

As described above, according to the present invention, even if the reading of code data is successful, code data can be read by always determining how the stability of reading is and outputting the result as a signal before reading is disabled. In the optical reading system according to the present invention, as the read data of code data and the result of determining the stability of the reading are output to the host control unit, the host control unit can always grasp a state of reading by the optical reader and can easily judge what causes unstable reading.

What is claimed is:

1. An optical reader for optically reading recorded code data and determining whether the reading is successful or not, comprising:

a light emitting means for emitting light to an object having code data;

a light receiving means for receiving said light reflected on said code data of said object; and a stability determination means for comparing a frequency of coincidence of read code data from start of reading with a predetermined reference frequency when a determination is made that the reading is successful after the reading of the code data is repeatedly tried, determining a stability of reading and outputting a signal showing a result of the determination.

2. The optical reader according to claim 1, further comprising:

an information notification means for notifying the result of the determination based on the output signal from said stability determination means to an operator.

3. The optical reader according to claim 1, wherein the comparison with the predetermined reference frequency by said stability determination means is performed based upon a ratio of the, frequency of coincidence of read data from start of reading to a frequency of all reading when recorded code data is repeatedly read.

4. The optical reader according to claim 1, wherein the result of the determination of stability is output together with the read data of the recorded code data.

5. An optical reader for optically reading recorded code data and determining whether the reading is successful or not, comprising:

a light emitting means for emitting light to an object having code data;

a light receiving means for receiving said light reflected on said code data of said object; and a stability determination means for comparing time which elapses from start of reading until read data is coincided by a predetermined frequency with predetermined reference time when a determination is made that the reading is successful after the reading of the code data is repeatedly tried, determining a stability of reading and outputting a signal showing a result of the determination.

6. The optical reader according to claim 5, further comprising:

an information notification means for notifying the result of the determination based on the output signal from said stability determination means to an operator.

7. The optical reader according to claim 5, wherein the result of the determination of stability is output together with the read data of the recorded code data.

8. An optical reading system for optically reading recorded code data and determining whether the reading is successful or not, comprising:

an optical reading means comprising a light emitting means for emitting light to an object having code data, and a light receiving means for receiving said light reflected on said code data of said object;

a stability determination means for comparing a frequency of coincidence of read code data from start of reading with a predetermined reference frequency when a determination is made that the reading is successful after the reading of the code data is repeatedly tried, determining a stability of reading and outputting a signal showing a result of the determination; and a control means for inputting the output signal of said stability determination means.

9. The optical reading system according to claim 8, wherein said optical reading means has a plurality of light emitting means and light receiving means, and said control means outputs a code error signal showing that specified code data is erroneous when the result of determination that stability is low is output from the plurality of light emitting means and light receiving means in reading the same code data.

10. The optical reading system according to claim 9, wherein said control means outputs an optical reading failure signal showing that a specified optical reading means fails when the result of determination that stability is low is output from the same optical reading means irrespective of code data.

11. The optical reading system according to claim 9, further comprising:

an information notification means for notifying the result of the determination based on the output signal from said control means to an operator.

12. The optical reading system according to claim 10, further comprising:

an information notification means for notifying the result of the determination based on the output signal from said control means to an operator.

13. The optical reading system according to claim 12, wherein said information notification means notifies an information meaning that the reading is unstable and the specified code data erroneous when the result of determination that stability is low is output as the plural results of determination of said stability determination means based on the respective code data from the plural devices of the light receiving means to the same code data and notifies other information meaning that the reading is unstable and specified optical reading means when the result of determination that stability is low is output from the same optical reading means irrespective of code data.

14. An optical reading method comprising the steps of:

optically reading recorded code data of an object;

determining whether the reading is successful or not, wherein when the reading of the code data is carried out, the reading activity is done repeatedly;

comparing a frequency of coincidence of read data from start of reading with a predetermined reference frequency;

determining a result of stability of reading based on the comparison when the reading is successful; and outputting an output signal indicating the result of the determination.

15. The optical reading method according to claim 14, further comprising the step of:

notifying an information meaning the result of the determination based on the output signal to an operator.

16. An optical reading method comprising the steps of:

optically reading recorded code data of an object by a plurality of optical reading devices;

determining whether the reading is successful or not, wherein when the reading of the code data is carried out, the reading activity is done repeatedly;

comparing a frequency of coincidence of read data from start of reading with a predetermined reference frequency;

determining a result of stability of reading based on the comparison when the reading is successful, wherein when the result of determination that stability is low is output from a plurality of optical reading devices in reading the same data, a determination is made that a specified code data is erroneous; and outputting an. output signal indicating the result of the determination and the specified code data.

17. The optical reading method according to claim 16, further comprising the step of:

when the result of determination that stability is low is output from the same optical reading devices irrespective of code data, a determination is made that same optical reading device fails and outputting a signal indicating the same optical reading device with the result of the determination.

18. An optical reading method comprising the steps of:

optically reading recorded code data of an object by a plurality of optical reading devices;

determining whether the reading is successful or not, wherein when the reading of the code data is carried out, the reading activity is done repeatedly;

comparing a frequency of coincidence of read data from start of reading with a predetermined reference frequency;

determining a result of stability of reading based on the comparison when the reading is successful, wherein when the result of determination that stability is low is output from the same optical reading device irrespective of code data, a determination is made that the same optical reading device fails; and outputting an output signal indicating the result of the determination and the same optical reading device.

* * * * *